US006297621B1

(12) United States Patent
Hui et al.

(10) Patent No.: US 6,297,621 B1
(45) Date of Patent: Oct. 2, 2001

(54) VOLTAGE SENSORLESS CONTROL OF POWER CONVERTERS

(75) Inventors: Ron Shu-Yuen Hui, Shatin; Henry Shu-Hung Chung, Scenecliff, both of (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 09/524,041

(22) Filed: Mar. 13, 2000

(51) Int. Cl.[7] ............................................. G05F 1/10
(52) U.S. Cl. ........................ 323/222; 323/283; 323/290
(58) Field of Search ........................... 323/283, 285, 323/286, 290, 222

(56) References Cited

U.S. PATENT DOCUMENTS 5,475,296 * 12/1995 Vinsant et al. ...................... 323/223
5,602,463 * 2/1997 Bendall et al. ...................... 323/266

OTHER PUBLICATIONS

Ohnuki et al., "Control of a Three–Phase PWM Rectifier Using Estimated AC–Side and DC–Side Voltages," *IBEE Transactions on Power Electronics*, vol. 14, No. 2, (Mar. 1999). pp. 222–226.

* cited by examiner

*Primary Examiner*—Shawn Riley
(74) *Attorney, Agent, or Firm*—Merchant & Gould P.C.

(57) ABSTRACT

Apparatus and methods are described for the voltage control of power converters in which the input and output voltages of the converter are not sensed directly but are derived from an inductor voltage which in turn is derived by sensing an instantaneous inductor current.

19 Claims, 14 Drawing Sheets

$V_{in}$ (50V/div) and $I_{in}$ (2.5A/div) [Timebase=5ms/div]

Inductor current $i_L$ (0.8A/div) [Timebase=2.5ms/div]

$V_{L1}'$, $V_L'$ and $V_{L2}'$ (5v/div) [timebase=2.5ms/div]

$V_{out}'$ and $V_{L_1}'$(5V/div) [Timebase=2.5ms/div]

Actual Output Voltage and Rectified $V_{in}$(50V/div) [Timebase=2.5ms/div]

VOLTAGE SENSORLESS CONTROL OF POWER CONVERTERS

FIELD OF THE INVENTION

This invention relates to methods and apparatus for the control of power converters, and in particular to methods and apparatus for such control that do not require sensing of input and output voltages.

BACKGROUND OF THE INVENTION

Switching power converters are widely used in a large number of domestic and industrial applications. Examples include computer systems, motor drives, and uninterruptible power supplies. With recent advances in semiconductor technologies and electronic packaging techniques, much research work has been done on new power circuit topologies, switching schemes, and control techniques for improving the converter efficiency, electrical specifications, and power density—all the time meeting various industrial standards. Examples of well known power converter topologies include buck converters, boost converters, buck boost converters, flyback converters and forward converters.

An underlying concept of power electronics is to be able to use low-level signals to control high power converter outputs. Conventionally this requires a comparison of the actual output voltage with a desired reference voltage and then giving commands to the power converters. However, it is a common practice that the power conversion stage and the control circuit be isolated in order to avoid noise coupling and grounding problems. In some situations input and output isolation in the power conversion stage is also desirable or necessary. These isolation requirements mean that signal-power interface techniques such as transformer coupling and optical isolation are necessary to achieve output regulation. These requirements substantially increase the cost and complexity of power converters.

PRIOR ART

One solution to this difficulty is to control switching power converters by using current sensors only and without requiring the use of voltage sensors. Such a system was described in T. Ohnuki, O. Mivashita, P. Lataire & G. Maston IEEE Transactions on Power Electronics, Vol. 14 No. 2. Mar. 1999. In the system proposed in this paper only current sensors are used that generate signals in response to the currents flowing in inductors. The sensed current can in theory be used to obtain the input and output voltages and so provide control information. The use of current sensors alone has a number of advantages including a reduction in the number of sensors needed, and it obviates the need to use a dissipative voltage divider, such as a resistive network, to obtain the input voltage in feedforward arrangements and in output voltage regulation. Additionally, no voltage isolator (such as an optical coupler) is needed to isolate the high-voltage output and the low-voltage control signals. This has an additional advantage in that some optical isolators have a finite linear range, eliminating the need for such isolators therefore increases the practical voltage measurement range.

Since the current can be sensed using a contactless flux linkage sensor such as a Hall effect sensor, electrical isolation between the power conversion stage and the control stage may be achieved easily. This has the effect that the power and ground signals can be separated inherently so as to reduce noise coupling.

The proposal of this prior art has, however, a number of practical drawbacks. Most importantly it assumes that the circuit is an "ideal" circuit which in reality no such circuit ever would be. In addition, the current rather than being continuously sensed is simply sampled once in every switching cycle with the inevitable approximations and inaccuracies that this implies.

SUMMARY OF THE INVENTION

According to one embodiment of the present invention, it provides an apparatus for the voltage control of a power converter, comprising means for sensing an inductor current and means for deriving input and/or output voltages from the current. The apparatus further includes means for converting the inductor current to an inductor voltage, comprising means for determining an instantaneous inductance, means for determining a rate of change of the inductor current, means for multiplying the inductor current by an inductor resistance, means for generating a product of outputs of the instantaneous inductance determining means and the inductor current change rate determining means, and means for summing outputs of the multiplying means and the product.

In preferred embodiments, the output of the inductor current to inductor voltage converting means comprises positive and negative envelopes and the input and output voltage deriving means comprises means for demodulating the envelopes.

Depending on the nature of the power converter, the demodulated positive and negative envelopes may be combined in various ways to derive the input and output voltages.

According to another embodiment of the present invention, it provides a method for the voltage control of a power converter, comprising sensing an inductor current and deriving input and/or output voltages from the current. The method further includes converting the inductor current to an inductor voltage, comprising: determining an instantaneous inductance, determining a rate of change of the inductor current, multiplying the inductor current by an inductor resistance, generating a product of outputs of the instantaneous inductance and the inductor current change rate, and summing the outputs of multiplying the inductor current by the inductor resistance and the product.

According to another embodiment, the present invention provides a power converter, comprising a feedback or feedforward control means, means for sensing an inductor current, means for deriving an input and/or output voltage therefrom, and means for inputting the derived input and/or output voltage to the feedback or feedforward control means.

BRIEF DESCRIPTION OF THE DRAWINGS

Some embodiments of the invention will now be described by way of example and with reference to the drawings, in which.

DETAILED DESCRIPTION OF THE INVENTION

A first embodiment of the invention will be described with reference to FIG. 1 which shows schematically an inductor current voltage converter (ICVC which is adapted to sense the current $i_L$ and to derive therefrom the voltage $v_L$ across the inductor (including an inductor resistance $r_L$). An inductor consists of a coil wound on a core and as is well known the voltage across an ideal inductor is simply the current flowing through the inductor multiplied by the inductance. In practice, however, this simple model needs to be corrected by taking into account the fact that the inductance may be current dependent and that the inductor will have a resistance. A more accurate equation therefore is:

$$v_L = L(i_L)\frac{di_L}{dt} + i_L r_L$$

The inductor current $i_L$ may be detected by any suitable means, direct or indirect, such as a Hall effect sensor, a current transformer, optical current sensors, and non-inductive resistors. As can be seen from FIG. 1 the ICVC comprises means 1 for deriving an inductance at a given inductor current, means 2 for differentiating the instantaneous inductor current against time, and means 3 for multiplying an instantaneous inductor current by an inductor resistance. The outputs of the inductance deriving means 1 and the current differentiating means 2 are multiplied together and then summed with the output of the multiplying means 3 to give an output $v_L$ in accordance with Eq. 1.

Figure 1:
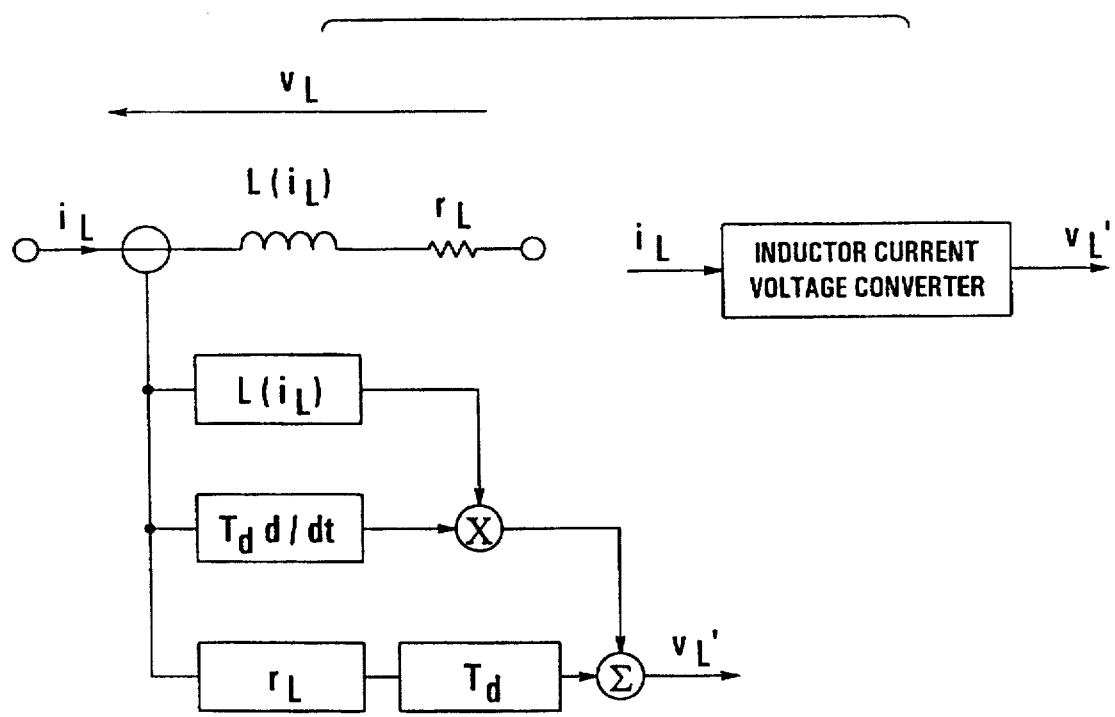
FIG. 1 is a schematic view of an inductor current to voltage converter (ICVC)
Figure 2A:
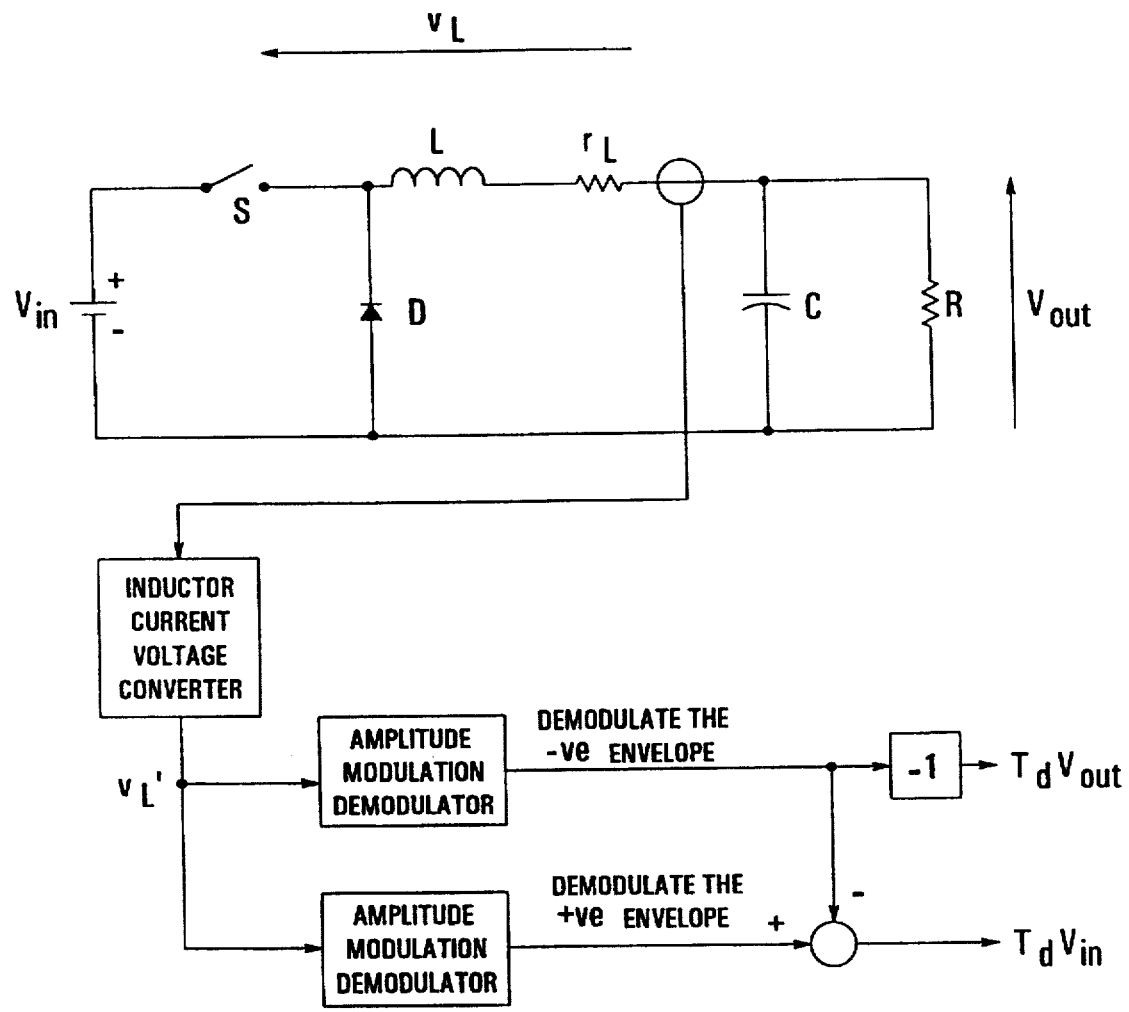
FIGS. 2(a) & (b) illustrate an embodiment of the invention employing the ICVC of FIG. 1 in a buck converter, FIGS. 3(a) & (b) illustrate an embodiment of the invention employing the ICVC of FIG. 1 in a boost converter, FIGS. 4(a) & (b) illustrate an embodiment of the invention employing the ICVC of FIG. 1 in a buck boost converter, FIGS. 5(a) & (b) illustrate an embodiment of the invention employing the ICVC of FIG. 1 in a flyback converter, FIGS. 6(a) & (b) illustrate an embodiment of the invention employing the ICVC of FIG. 1 in a forward converter.

FIGS. 2(a) and (b) show how the ICVC of FIG. 1 may be used to determine the input and output voltages of a buck converter. FIG. 2 (a) shows a conventional topology of a step-down buck converter in which an ICVC is used to sense the inductor current and to convert it to an inductor voltage. The circuit consists of one controlled switch S, one uncontrolled switch D, one inductor L, one capacitor C and an output load resistor R. The converter is supplied with from an input voltage $V_{in}$ to R, having an output voltage $V_{out}$. S is switched with a period of T and a duty time of $T_{on}$. The ratio between $T_{on}$ and T controls the amount of power transferred from $V_{in}$ to R. When the converter is operated in continuous current mode S and D operate alternately, that is to say when S is in an on state, D is in an off state and vice versa. When the converter is operated in a discontinuous conduction mode both S and D may be in an off state when the inductor current is zero.

In the first mode S is on and D is off. The inductor current will increase and the inductor voltage $v_L$ can be expressed as $v_L = V_{in} - V_{out}$. In the second mode S is off and D is on, the inductor current will decrease and the inductor voltage can be expressed as $v_L = -V_{out}$. These considerations assume that S and D are ideal switches, that is to say when they are on resistance is zero, and when they are off resistance is infinite.

Figure 2B:
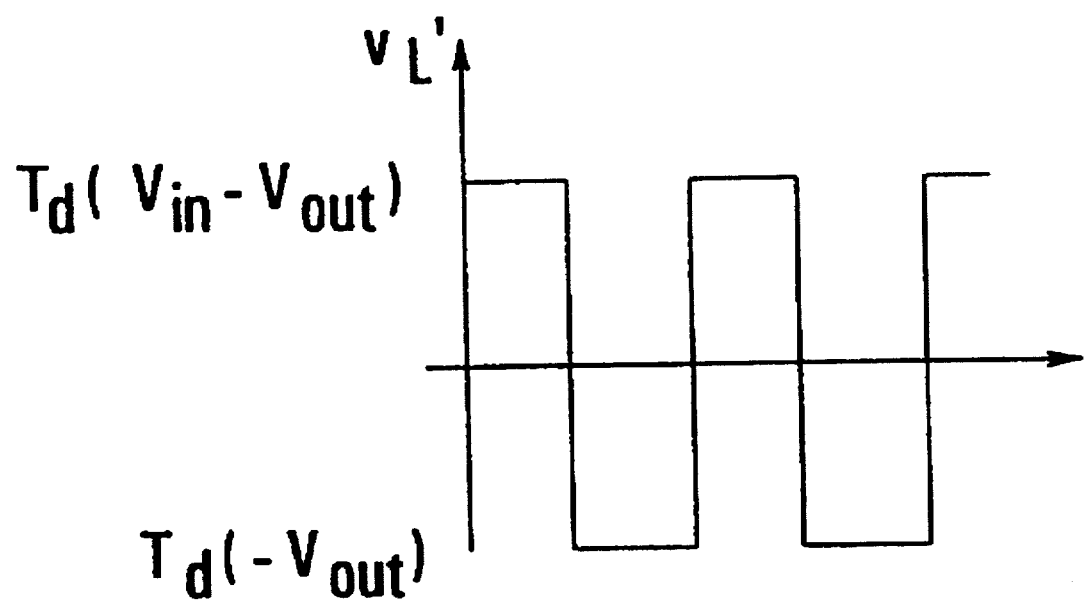

The switching frequency of S and D is typically greater than 20 kHz and is therefore much higher than the circuit dynamics, and this means that the inductor voltage in fact contains two envelopes that are shown in FIG. 2(b). The upper envelope represents $V_{in} - V_{out}$ while the lower envelope represents $-V_{out}$. Thus by using an amplitude modulation demodulator (AMD) circuit $V_{out}$ can be obtained directly by demodulating the lower envelope from FIG. 2(a). Once $V_{out}$ has been obtained, $V_{in}$ can be obtained by demodulating the upper envelope and subtracting the lower envelope. It will be seen therefore that both $V_{in}$ and $V_{out}$ can be obtained from measuring the inductor current voltage without requiring any direct voltage measurement. Thus all feedback and control operations can be performed by measuring the inductor current and without requiring a direct voltage measurement. It will also be noted that the inductor current is measured continuously and that the ICVC takes into account the variation of inductance with current and the inductor resistance.

Figure 3A:
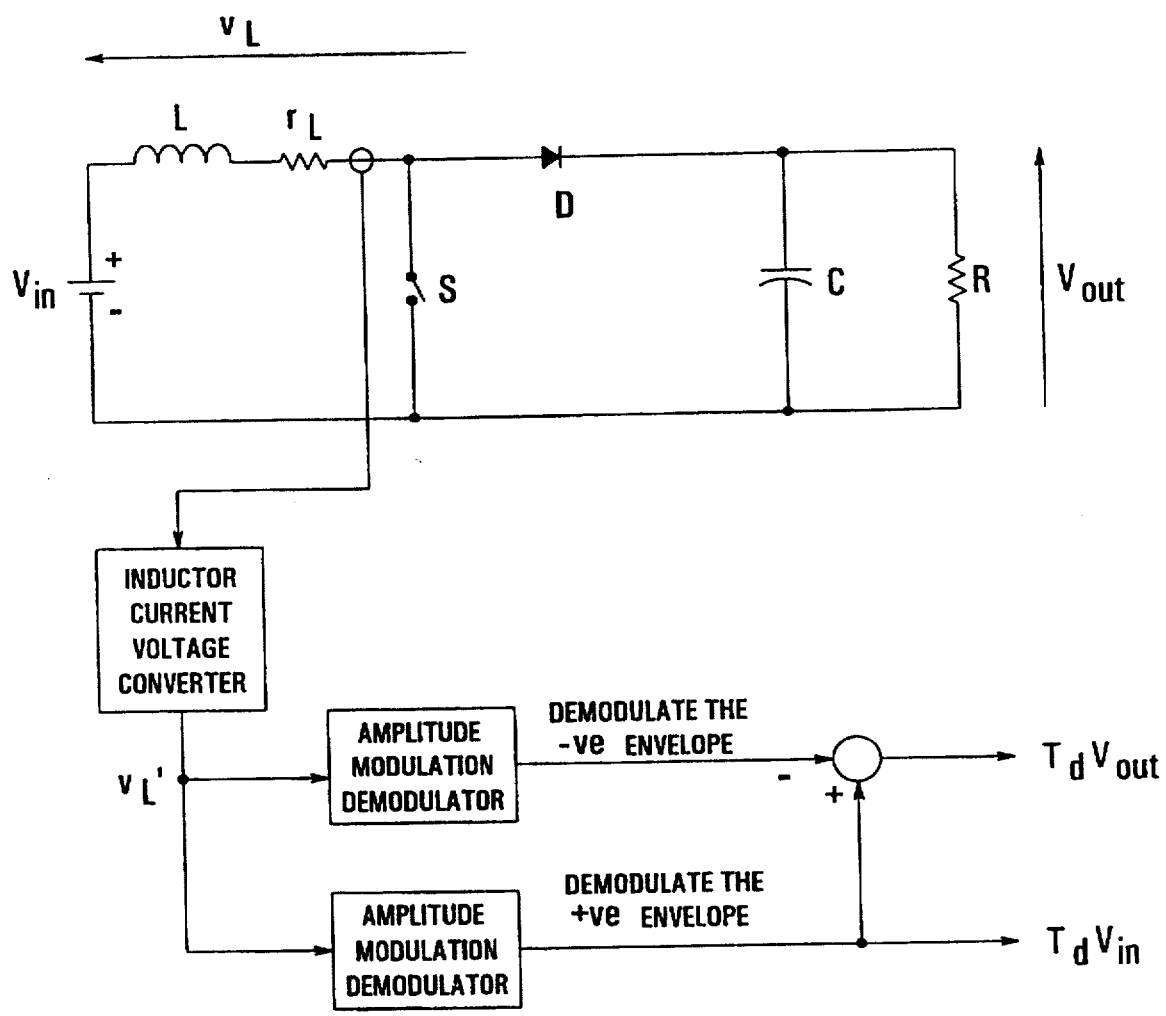
Figure 3B:
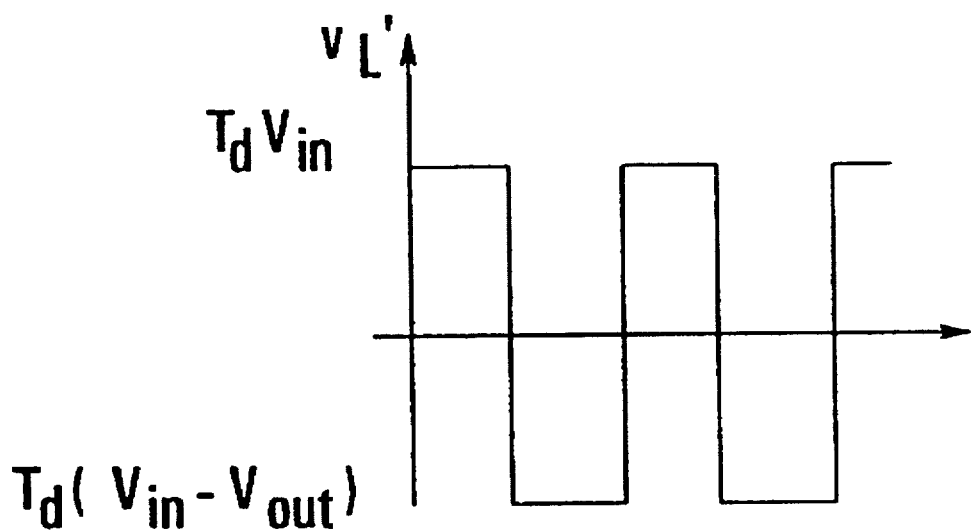

The present invention may be applied to other forms of conventional converter topologies. FIG. 3(a) for example shows a conventional boost converter topology in which an ICVC in accordance with the present invention is used to detect the instantaneous inductor current and to sense the input and output voltages from the inductor current. As in the embodiment of FIG. 2(a) the output comprises an upper positive envelope and a lower negative envelope. In a boost converter topology the positive envelope is $V_{in}$ while the lower envelope is $V_{in} - V_{out}$. Thus by demodulating the positive envelope $V_{in}$ can be obtained directly, while $V_{out}$ may be obtained by demodulating the negative envelope and subtracting it from the positive envelope.

Figure 4A:
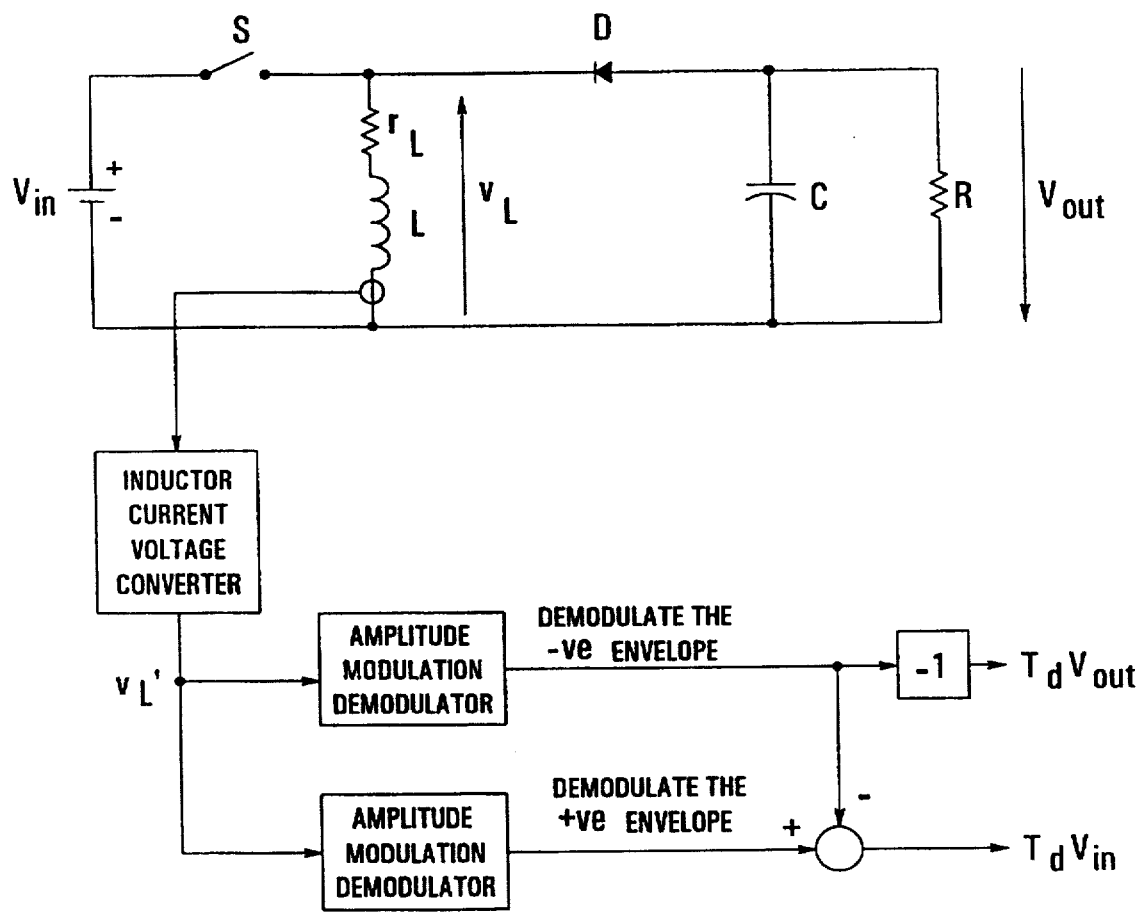
Figure 4B:
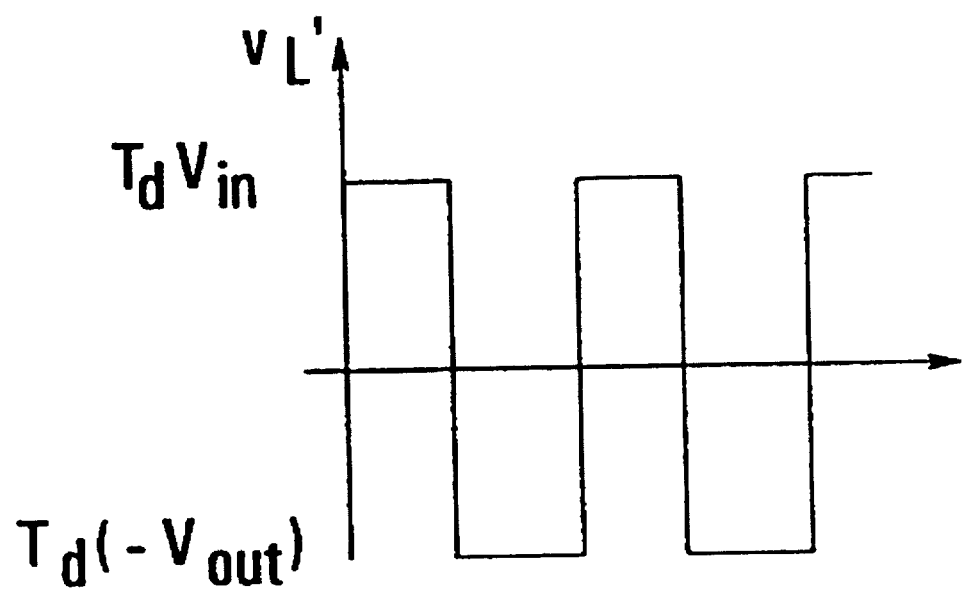

FIGS. 4(a) and (b) show a buck boost converter topology with the corresponding envelopes following use of an ICVC in accordance with the present invention to detect the inductor current. In this embodiment the upper envelope is simply $V_{in}$ which can therefore be determined directly, while the lower envelope is $-V_{out}$ and so $V_{out}$ can be derived simply by changing the sign of the negative envelope.

Figure 5A:
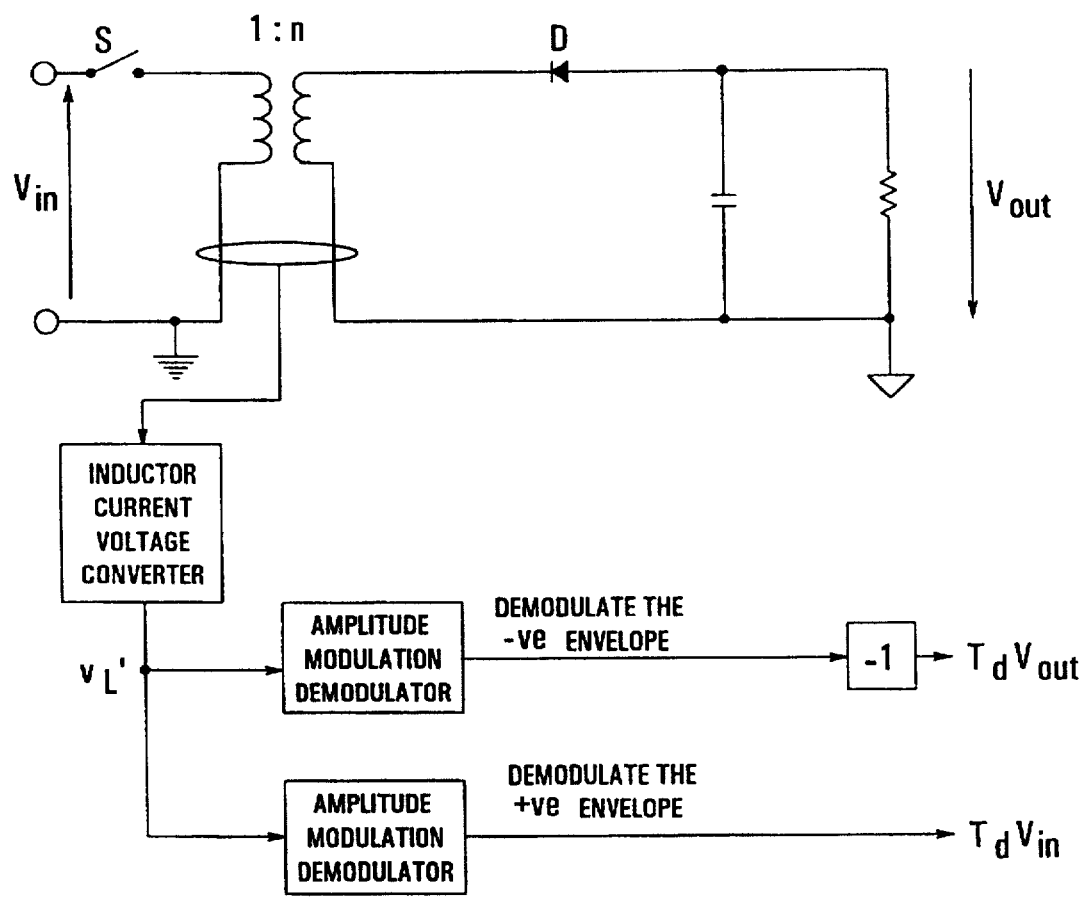
Figure 5B:
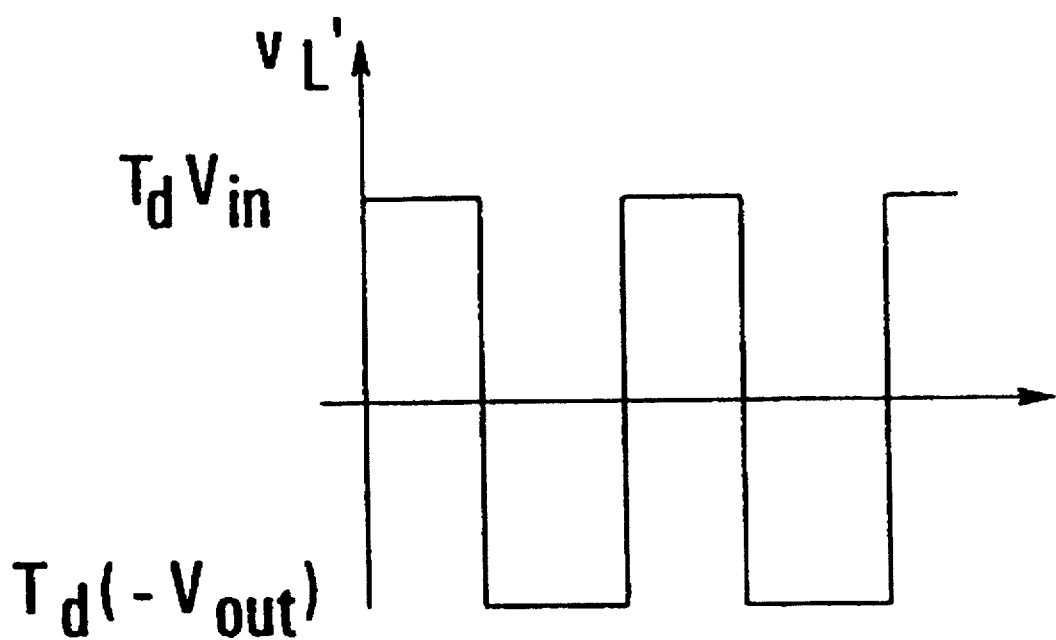

FIGS. 5(a) and (b) show a flyback converter topology with the corresponding envelopes following use of an ICVC in accordance with the present invention to detect the inductor current. In this embodiment the upper envelope is simply $V_{in}$ which can therefore be determined directly, while the lower envelope is $-V_{out}$ and so $V_{out}$ can be derived simply by changing the sign of the negative envelope.

Figure 6A:
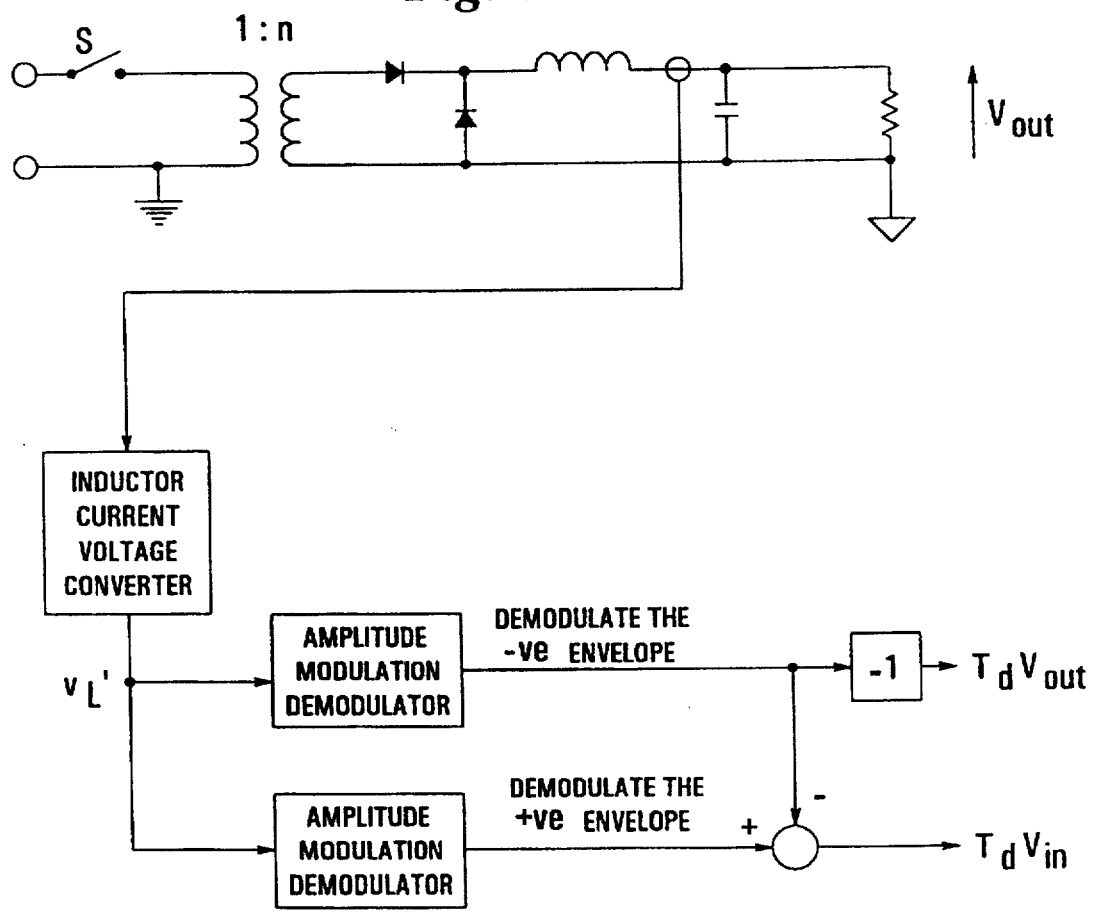
Figure 6B:
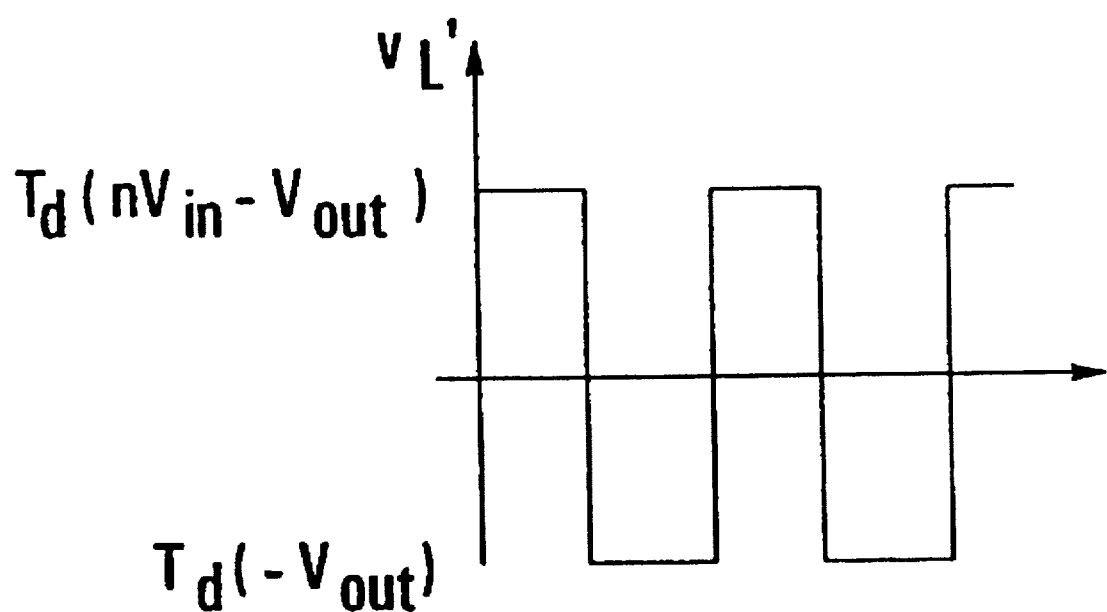

FIGS. 6(a) and (b) show a forward converter topology with an ICVC according to the present invention being used to detect the inductor current in the inductor in the output side of the converter. Following demodulation of the positive and negative envelopes, the negative envelope is $-V_{out}$ and so $V_{out}$ can be derived simply by changing the sign of the negative envelope. The positive envelope is $nV_{in} - V_{out}$ (where n is the transformer turn ratio) and so $nV_{in}$ can be obtained by simply subtracting the negative envelope from the positive envelope.

Figure 7:
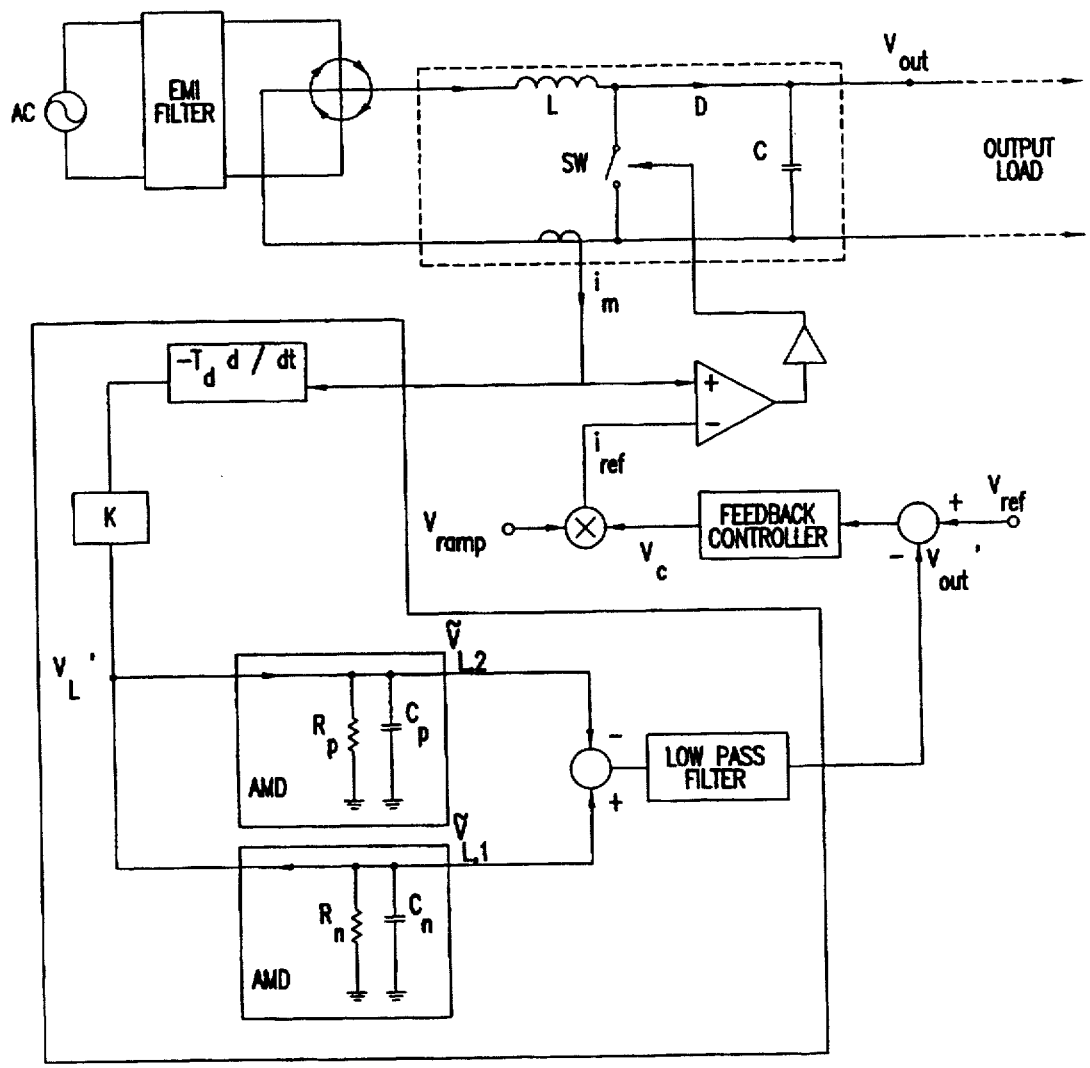
FIG. 7 illustrates a boost converter the ICVC of FIG. 1 to derive an output voltage to be input to a feedback control means.

FIG. 7 shows an embodiment of the present invention in which the output voltage as determined by an ICVC in accordance with the invention is used to provide a feedback signal to control a boost converter. The values of the components of the converter are as follows: the power conversion stage is rated for $V_{in}=200$ sin wt, $\omega=2\pi(50)$, $V_{out}=170V$, $L=1.5$ mH, $C=470$ μF, $R_L=231\Omega$, while the feedback network has a gain $K=110$, $T_d=0.75$ μs, $C_p=0.1$ μF, $R_p=100$ kΩ, $C_n=0.033$ μF and $R_n=30$ kΩ. The transfer function of the feedback controller is $1/(1+0.005 \text{ s})$. As described with reference to FIGS. 3(a) & (b) above in a boost converter $V_{in}$ is obtained directly by demodulating the positive envelope, while the scaled output voltage $V'_{out}$ is derived by subtracting the negative envelope from the positive envelope. In the embodiment of FIG. 7 the difference between $V'_{out}$ and a desired reference output voltage $V_{ref}$ is input via a feedback controller to a differential amplifier the other input of which is taken from a stabilisation ramp and the output of which controls the switching frequency of switch S.

Figure 8:
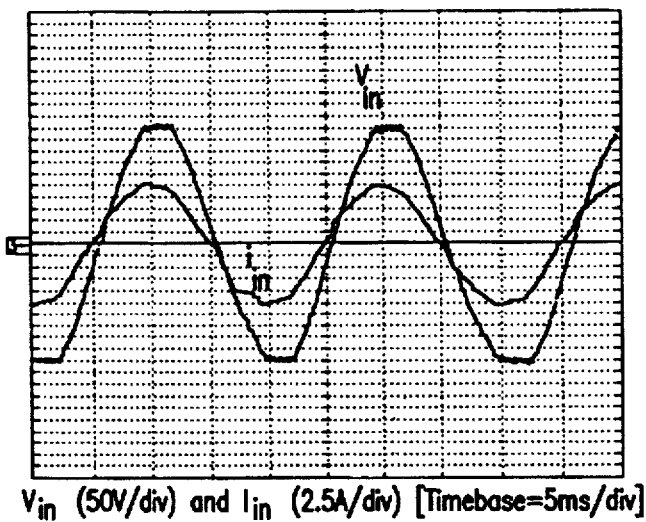
FIGS 8 to 12 are waveforms of measured and derived values using a protoype made in accordance with the embodiment of FIG. 7.
Figure 9:
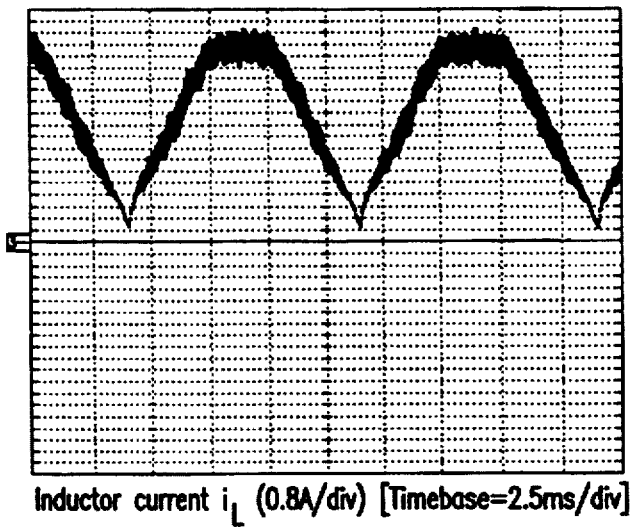
Figure 10:
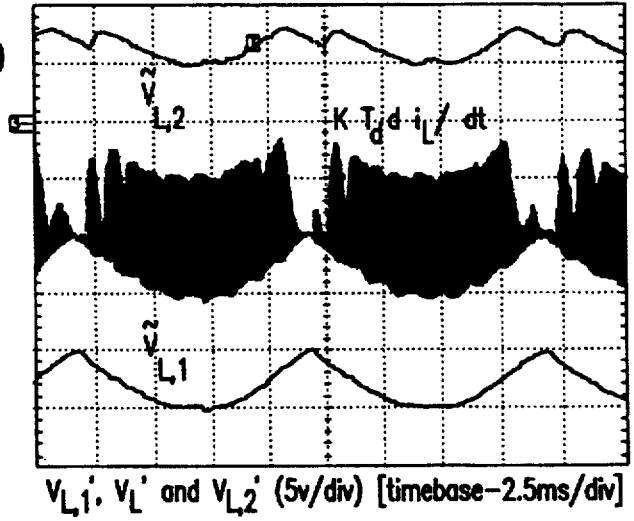
Figure 11:
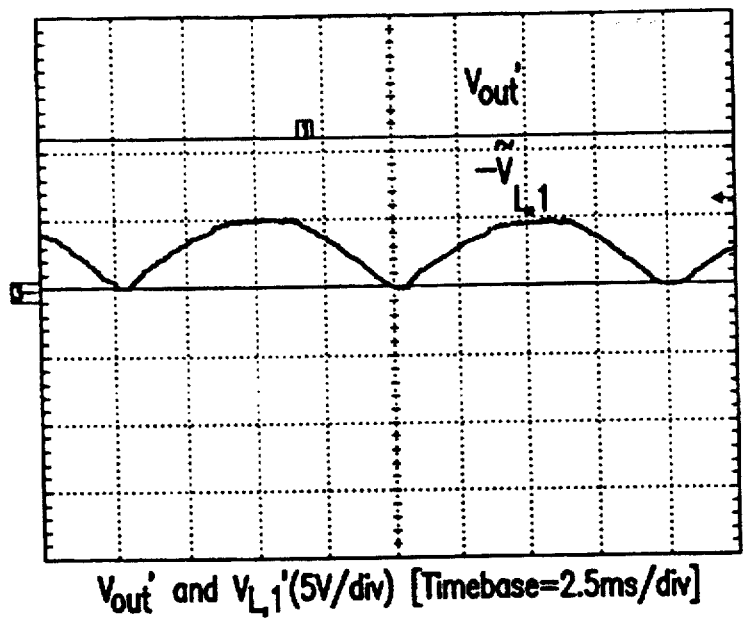
Figure 12:
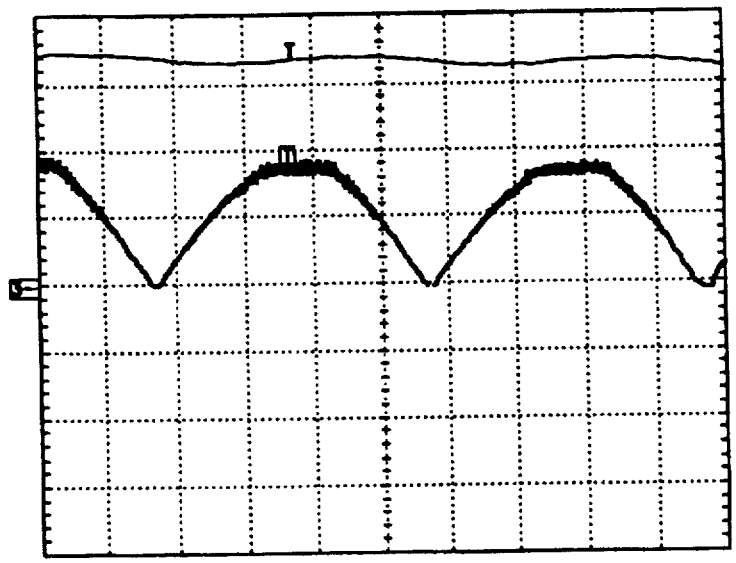

The performance of the embodiment of FIG. 7 is shown in FIGS. 8 to 12. FIG. 8 shows the input voltage and input current waveforms and it can be seen that they are in phase with each other. FIG. 9 shows the inductor current waveform. FIG. 10 shows the inductor voltage and the two envelopes $\tilde{v}_{L,2}'$ and $\tilde{v}_{L,1}'$. FIG. 1 shows the sensed output voltage $v_{out}'$ and $-v_{L,1}'$ which is derived from the input voltage. It can be seen that $v_{out}'$ is almost a constant and $-v_{L,1}'$ follows a rectified sinusoidal wave shape. FIG. 12 shows the actual output voltage and the rectified input voltage, it will be seen that they are similar in profile to those of FIG. 12 however the magnitudes of $v_{out}'$ and $-v_{L,1}'$ are much smaller than the corresponding waveforms in FIG. 12. The accuracy of the present invention may be judged by comparing the values for the input and output voltages derived from the present invention with the actual ones. The results of such a comparison are shown in Table 1. The results show a maximum error in the input voltage of 2.59% between the range of 48V to 118V, and a maximum error of 3.15% in the output voltage between the range of 99V and 190.4V. These results show the practicability of the present invention.

TABLE 1

| Actual $v_{in}$ (V) | Derived $v_{in}$ (V) | Error (%) |
| --- | --- | --- |
| 48 | 49.24 | 2.59 |
| 56 | 56.72 | 1.29 |
| 64 | 62.98 | 1.60 |
| 74 | 73.04 | 1.29 |
| 82 | 81.75 | 0.31 |
| 90 | 89.23 | 0.86 |
| 100 | 100.51 | 0.51 |
| 110 | 109.22 | 0.71 |
| 1118 | 119.28 | 1.09 |

| Actual $v_{out}$ (V) | Derived $v_{out}$ (V) | Error (%) |
| --- | --- | --- |
| 99 | 102.11 | 3.15 |
| 111.8 | 111.92 | 0.11 |
| 122.2 | 119.77 | 1.99 |
| 136 | 134.97 | 0.76 |
| 147.1 | 144.78 | 1.58 |
| 157.7 | 159.49 | 1.14 |
| 169.2 | 169.30 | 0.06 |
| 179.3 | 179.11 | 0.11 |
| 190.4 | 191.37 | 0.51 |

What is claimed is:

1. Apparatus for the voltage control of power converter, comprising means for sensing an inductor current and means for deriving input and/or output voltages from said current, wherein said apparatus further comprises means for converting said inductor current to an inductor voltage comprising:
   (a) means for continuously determining an instantaneous inductance,
   (b) means for continuously determining a rate of change of said inductor current,
   (c) means for multiplying said inductor current by an inductor resistance,
   (d) means for generating a product of the outputs of (a) and (b), and
   (e) means for summing the outputs of (c) and (d).

2. Apparatus as claimed in claim 1 wherein the output of said inductor current to inductor voltage converting means comprises positive and negative envelopes and wherein said input and output voltage deriving means comprises means for demodulating said envelopes.

3. Apparatus as claimed in claim 1 wherein said derived input and/or output voltage is input to a control circuit.

4. Apparatus as claimed in claim 2 wherein said converter is a buck converter and means are provided to reverse the sign of the demodulated negative envelope to derive the output voltage, and wherein means are provided to subtract the demodulated negative envelope from demodulated positive envelope to derive the input voltage.

5. Apparatus as claimed in claim 2 wherein said converter is a boost converter and means are provided to subtract the demodulated negative envelope from the demodulated positive envelope to derive the output voltage, and wherein the input voltage is derived directly from the demodulated positive envelope.

6. Apparatus as claimed in claim 2 wherein said converter is a buck boost converter and wherein means are provided to reverse the sign of the demodulated negative envelope to derive the output voltage, and wherein the input voltage is derived directly from the demodulated positive envelope.

7. Apparatus as claimed in claim 2 wherein said converter is a flyback converter and wherein means are provided to reverse the sign of the demodulated negative envelope to derive the output voltage, and wherein the input voltage is derived directly from the demodulated positive envelope.

8. Apparatus as claimed in claim 2 wherein said converter is a forward converter and wherein means are provided to reverse the sign of the demodulated negative envelope to derive the output voltage, and wherein the demodulated negative envelope is subtracted from the demodulated positive envelope to determine a product of the input voltage and a transformer ratio.

9. A method for the voltage control of a power converter comprising sensing an inductor current and deriving input and output voltages from said current, wherein said method further comprises converting said inductor current to an inductor voltage comprising:
   (a) continuously determining an instantaneous inductance,
   (b) continuously determining a rate of change of said inductor current,
   (c) multiplying said inductor current by an inductor resistance,
   (d) generating a product of the outputs of (a) and (b), and
   (e) summing the outputs of (c) and (d).

10. A method as claimed in claim 9 wherein said inductor voltage comprises positive and negative envelopes and wherein said input and said output voltages are derived by demodulating said envelopes.

11. A method as claimed in claim 9 wherein said derived input and/or output voltage is used as an input to a control circuit.

12. A method as claimed in claim 10 wherein said converter is a buck converter and wherein the output voltage is derived by reversing the sign of the demodulated negative envelope, and wherein the input voltage is derived by subtracting the demodulated negative envelope from the demodulated positive envelope.

13. A method as claimed in claim 10 wherein said converter is a boost converter and wherein the output voltage is derived by subtracting the demodulated negative envelope from the demodulated positive envelope, and wherein the input voltage is derived directly from the demodulated positive envelope.

14. A method as claimed in claim 10 wherein said converter is a buck boost converter, wherein the output voltage is derived by reversing the sign of the demodulated negative envelope, and wherein the input voltage is derived directly from the demodulated negative envelope.

15. A method as claimed in claim 10 wherein said converter is a flyback converter, wherein the output voltage is derived by reversing the sign of the demodulated negative envelope, and wherein the input voltage is derived directly from the demodulated negative envelope.

16. A method as claimed in claim 10 wherein said converter is a forward converter, wherein the output voltage is derived by reversing the sign of the demodulated negative envelope, and wherein the product of the input voltage and the transformer turn ratio is derived by subtracting the demodulated negative envelope from the demodulated positive envelope.

17. A power converter comprising a feedback or feedforward control means, means for continuously sensing an inductor current and means for continuously deriving an input and/or output voltage therefrom, and means for inputting said derived input and/or output voltage to said feedback or feedforward control means.

18. A power converter as claimed in claim 17 wherein said means for deriving an output voltage comprises, means for converting an inductor current to an inductor voltage comprising:

(a) means for continuously determining an instantaneous inductance, (b) means for continuously determining a rate of change of said inductor current, (c) means for multiplying said inductor current by an inductor resistance, (d) means for generating a product of the output of (a) and (b), and (e) means for summing the outputs of (c) and (d).

19. A power converter as claimed in claim 18 wherein the output of said inductor current to inductor voltage converting means comprises a positive envelope and a negative envelope and wherein said output deriving means comprises means for demodulating said envelopes.

* * * * *